(12) United States Patent
Orihara et al.

(10) Patent No.: US 11,868,853 B2
(45) Date of Patent: Jan. 9, 2024

(54) ANALYSIS DEVICE, ANALYSIS METHOD, AND ANALYSIS PROGRAM

(71) Applicant: NIPPON TELEGRAPH AND TELEPHONE CORPORATION, Chiyoda-ku (JP)

(72) Inventors: Shingo Orihara, Musashino (JP); Masaki Tanikawa, Musashino (JP); Tohru Sato, Musashino (JP); Yuta Iwaki, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 1169 days.

(21) Appl. No.: 16/078,067

(22) PCT Filed: Jan. 19, 2017

(86) PCT No.: PCT/JP2017/001709
§ 371 (c)(1),
(2) Date: Aug. 21, 2018

(87) PCT Pub. No.: WO2017/145591
PCT Pub. Date: Aug. 31, 2017

(65) Prior Publication Data
US 2019/0087750 A1  Mar. 21, 2019

(30) Foreign Application Priority Data

Feb. 26, 2016  (JP) .................................. 2016-036383

(51) Int. Cl.
*G06N 20/00* (2019.01)
*G06F 21/55* (2013.01)
(Continued)

(52) U.S. Cl.
CPC ............ *G06N 20/00* (2019.01); *G06F 16/285* (2019.01); *G06F 21/316* (2013.01); *G06F 21/552* (2013.01); *G06N 5/045* (2013.01)

(58) Field of Classification Search
CPC ...... G06N 20/00; G06N 5/045; G06F 16/285; G06F 21/316; G06F 21/552; G06F 11/3476; H04L 63/1425
(Continued)

(56) References Cited

U.S. PATENT DOCUMENTS 8,869,276 B2 * 10/2014 Crovella ................. H04L 43/16
713/168
9,225,738 B1 * 12/2015 Chiles ................. H04L 63/1425
(Continued)

FOREIGN PATENT DOCUMENTS

JP  2008-192091 A   8/2008
JP  2008192091 A * 8/2008
(Continued)

OTHER PUBLICATIONS

Dorothy E. Denning, An Intrusion-Detection Model, Apr. 1, 1986, 1986 IEEE Symposium on Security and Privacy (p. 118) (Year: 1986).*

(Continued)

*Primary Examiner* — Lynn D Feild
*Assistant Examiner* — Ethan V Vo
(74) *Attorney, Agent, or Firm* — Oblon, McClelland, Maier & Neustadt, L.L.P.

(57) ABSTRACT

An input unit receives an input of data, as learning purpose data and determination target data, in which requests made to a server by a user are represented in a time series. Then, a shaping unit shapes the received data. A classifying unit classifies the shaped data for each user who made the requests. Then, a learning unit extracts, from the classified
(Continued)

learning purpose data, consecutive n requests as feature values of the learning purpose data, performs learning by using the feature values of the learning purpose data, and creates a profile for each user. A determination unit extracts, from the classified determination target data, consecutive n requests as feature values of the determination target data and performs determination of the determination target data based on the feature values of the determination target data and based on the profiles created by the learning unit.

7 Claims, 17 Drawing Sheets

(51) Int. Cl.
    *G06F 21/31*     (2013.01)
    *G06N 5/045*     (2023.01)
    *G06F 1/28*     (2006.01)
    *G06F 16/28*     (2019.01)

(58) Field of Classification Search
    USPC .................................................. 706/12, 20
    See application file for complete search history.

(56) References Cited

U.S. PATENT DOCUMENTS

| | | | | |
|---|---|---|---|---|
| 9,531,736 | B1* | 12/2016 | Torres | H04L 63/1441 |
| 10,346,856 | B1* | 7/2019 | Kohli | G06N 7/01 |
| 2009/0164395 | A1* | 6/2009 | Heck | G06F 16/954 |
| | | | | 706/16 |
| 2009/0293121 | A1* | 11/2009 | Bigus | G06F 21/316 |
| | | | | 726/22 |
| 2009/0327914 | A1* | 12/2009 | Adar | G06F 16/958 |
| | | | | 715/745 |
| 2012/0137367 | A1* | 5/2012 | Dupont | G06F 21/00 |
| | | | | 726/25 |
| 2013/0104230 | A1* | 4/2013 | Tang | H04L 63/1458 |
| | | | | 726/23 |
| 2015/0020199 | A1* | 1/2015 | Neil | H04L 63/1408 |
| | | | | 726/23 |

FOREIGN PATENT DOCUMENTS

| | | |
|---|---|---|
| JP | 2010-97342 A | 4/2010 |
| JP | 2014-106661 A | 6/2014 |

OTHER PUBLICATIONS

Trinita et al., A Sliding Window Technique for Covariance Matrix to Detect Anomalies on Stream Traffic, Aug. 1, 2015, 2015 International Conference on Control, Electronics, Renewable Energy and Communications (ICCEREC) (pp. 176-181) (Year: 2015).*
Bosman et al., Online Fusion of Incremental Learning for Wireless Sensor Networks, Dec. 1, 2014, 2014 IEEE International Conference on Data Mining Workshop (pp. 525-532) (Year: 2014).*
Shetty et al., An integrated Machine Learning and Control Theoretic model for mining concept-drifting data streams, Nov. 1, 2011, 2011 IEEE International Conference on Technologies for Homeland Security (HST) (pp. 75-80) (Year: 2011).*
Jason Brownlee, How to Prepare Data For Machine Learning, Dec. 25, 2013 (Year: 2013).*
Garcia et al., Analyzing Log Files for Postmortem Intrusion Detection, Jan. 18, 2013, IEEE Transactions on Systems, Man, and Cybernetics, Part C (Applications and Reviews) (vol. 42, Issue: 6, pp. 1690-1704) (Year: 2013).*
International Search Report dated Feb. 28, 2017 in PCT/JP2017/001709 filed Jan. 19, 2017.
Kanenishi, K. et al., "Watching Security System Using the User Model for Limited Web Site," IPSJ SIG Notes Chishiki to Fukuzatsu Kei No. 121, Jul. 18, 2000, vol. 2000, No. 66, 12 pages (with English Translation).

* cited by examiner

| No. | SOURCE IP ADDRESS | DATE AND TIME | REQUEST |
|---|---|---|---|
| 1 | 192.168.0.1 | 11/Nov/2015 09:00:00 | GET /index.html |
| 2 | 192.168.0.2 | 11/Nov/2015 09:00:05 | GET /top.html |
| 3 | 192.168.0.1 | 11/Nov/2015 09:01:00 | GET /menu.html |
| ⋮ | ⋮ | ⋮ | ⋮ |

FIG.6

| No. | SOURCE IP ADDRESS | DATE AND TIME | REQUEST |
|---|---|---|---|
| 1 | 192.168.0.1 | 11/Nov/2015 09:00:00 | GET /page1 |
| 2 | 192.168.0.1 | 11/Nov/2015 09:01:00 | GET /page2 |
| 3 | 192.168.0.1 | 11/Nov/2015 09:01:15 | GET /page3 |
| 4 | 192.168.0.1 | 11/Nov/2015 09:02:10 | GET /page4 |
| 5 | 192.168.0.1 | 11/Nov/2015 09:03:11 | GET /page5 |
| ... | ... | ... | ... |

⇒ (GET /page1 and GET /page2) ARE FEATURE VALUE
⇒ (GET /page2 and GET /page3) ARE FEATURE VALUE
⇒ (GET /page3 and GET /page4) ARE FEATURE VALUE
...

FIG.7

| No. | SOURCE IP ADDRESS | DATE AND TIME | REQUEST |
|---|---|---|---|
| 1 | 192.168.0.1 | 11/Nov/2015 09:00:00 | GET /page1 |
| 2 | 192.168.0.1 | 11/Nov/2015 09:01:00 | GET /page2 |
| 3 | 192.168.0.1 | 11/Nov/2015 09:01:15 | GET /page3 |
| 4 | 192.168.0.1 | 11/Nov/2015 09:02:10 | GET /page4 |
| 5 | 192.168.0.1 | 11/Nov/2015 09:03:11 | GET /page5 |
| ... | ... | ... | ... |

⇒ (GET /page1, GET /page2, and 60s) ARE FEATURE VALUE
⇒ (GET /page2, GET /page3, and 15s) ARE FEATURE VALUE
⇒ (GET /page3, GET /page4, and 55s) ARE FEATURE VALUE
...

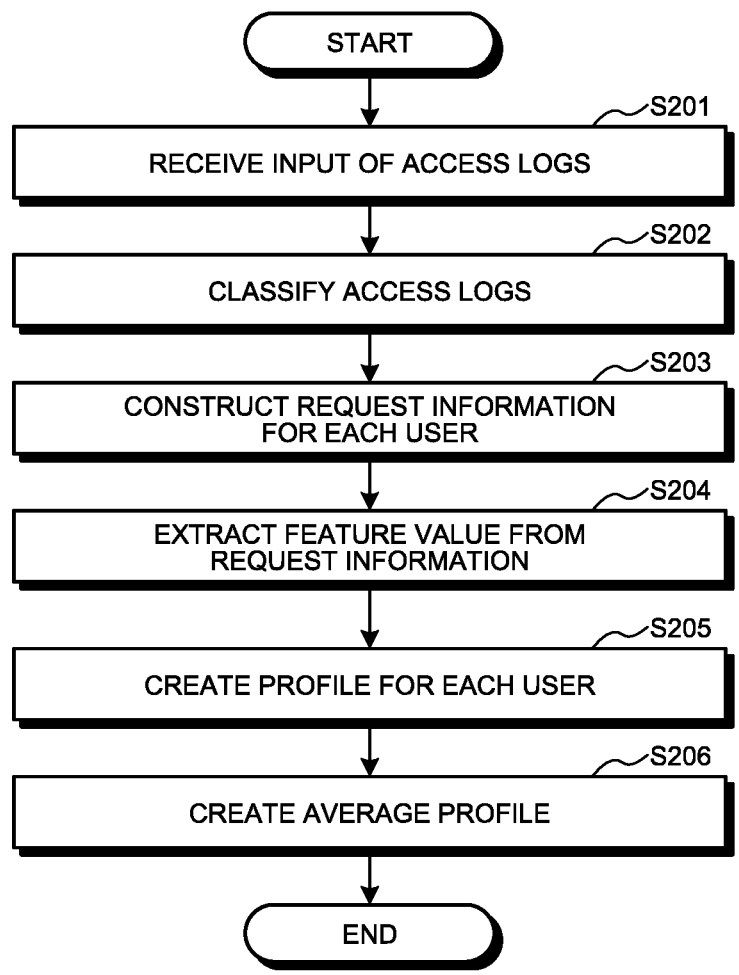

FIG.14

FEATURE VALUE EXTRACTION TARGET

| No. | SOURCE IP ADDRESS | DATE AND TIME | REQUEST |
|---|---|---|---|
| 1 | 192.168.0.1 | 11/Nov/2015 09:00:00 | GET /page1 |
| 2 | 192.168.0.1 | 11/Nov/2015 09:01:00 | GET /page2 |
| 3 | 192.168.0.1 | 11/Nov/2015 09:01:15 | GET /page3 |
| 4 | 192.168.0.1 | 11/Nov/2015 09:02:10 | GET /page4 |

⇒(GET /page1 and GET /page2) ARE FEATURE VALUE

⇒(GET /page2 and GET /page3) ARE FEATURE VALUE

⇒(GET /page3 and GET /page4) ARE FEATURE VALUE

* CASE WHERE TRANSITION ORDER OF PAGES ARE USED AS FEATURE VALUES

FIG.15

REQUEST INFORMATION

| No. | SOURCE IP ADDRESS | DATE AND TIME | REQUEST |
|---|---|---|---|
| 1 | 192.168.0.1 | 11/Nov/2015 09:00:00 | GET /page1 |
| 2 | 192.168.0.1 | 11/Nov/2015 09:01:00 | GET /page2 |
| 3 | 192.168.0.1 | 11/Nov/2015 09:01:15 | GET /page3 |
| 4 | 192.168.0.1 | 11/Nov/2015 09:02:10 | GET /page4 |
| 5 | 192.168.0.1 | 11/Nov/2015 09:03:11 | GET /page5 |
| ... | ... | ... | ... |

⇧ DELETE FIRST REQUEST

REQUEST INFORMATION (AFTER UPDATED)

| No. | SOURCE IP ADDRESS | DATE AND TIME | REQUEST |
|---|---|---|---|
| 2 | 192.168.0.1 | 11/Nov/2015 09:01:00 | GET /page2 |
| 3 | 192.168.0.1 | 11/Nov/2015 09:01:15 | GET /page3 |
| 4 | 192.168.0.1 | 11/Nov/2015 09:02:10 | GET /page4 |
| 5 | 192.168.0.1 | 11/Nov/2015 09:03:11 | GET /page5 |
| ... | ... | ... | ... |

ANALYSIS DEVICE, ANALYSIS METHOD, AND ANALYSIS PROGRAM

FIELD

The present invention relates to an analysis device, an analysis method, and an analysis program.

BACKGROUND

Conventionally, there is a known technology for acquiring, based on pages browsed by users, a combination of transition information formed by functions of the search, product lists, purchases, and the like included in the subject page as feature values and predicts behaviors of the user who use Websites. In this technology, by performing clustering and learning of users based on the feature values, users having similar browsing behavior patterns are provided or browsing behaviors of users are predicted from the browsing behavior patterns (for example, Patent Literature 1).

CITATION LIST

Patent Literature

Patent Literature 1: Japanese Laid-open Patent Publication No. 2014-106661

SUMMARY

Technical Problem

However, in the conventional technology, there is a problem in that it is difficult to detect abnormal behaviors of users or impersonation of users.

For example, because the conventional technology has only a function of extracting similar browsing behavior patterns, it is difficult to detect an abnormal behavior dissimilar to the behavior patterns of any other users. Furthermore, because there is no function of comparing with the own past behavior patterns, it is difficult to detect impersonation due to a result of having impersonated even if an unusual behavior pattern that is different from the normal pattern is taken.

Solution to Problem

To solve a problem and to achieve an object, an analysis device includes:
  an input unit that receives an input of data, as learning purpose data and determination target data, in which requests made to a server by a user are represented in a time series;
  a classifying unit that classifies, for each user who made the requests, the data received by the input unit;
  a learning unit that extracts, from the learning purpose data classified by the classifying unit, the first number of consecutive requests as feature values of the learning purpose data, that performs learning by using the feature values of the learning purpose data, and that creates a profile for each user; and
  a determination unit that extracts, from the determination target data classified by the classifying unit, the first number of consecutive requests as feature values of the determination target data and that determines, based on the feature values of the determination target data and based on the profiles created by the learning unit, whether the determination target data is abnormal.

An analysis method performed by an analysis device, the analysis method includes:
  an inputting step of receiving an input of data, as learning purpose data and determination target data, in which requests made to a server by a user are represented in a time series;
  a classifying step of classifying, for each user who made the requests, the data received at the inputting step;
  a learning step of extracting, from the learning purpose data classified at the classifying step, the first number of consecutive requests as feature values of the learning purpose data, performing learning by using the feature values of the learning purpose data, and creating a profile for each user; and
  a determination step of extracting, from the determination target data classified at the classifying step, the first number of consecutive requests as feature values of the determination target data and determining, based on the feature values of the determination target data and based on the profiles created at the learning step, whether the determination target data is abnormal.

An analysis program that causes a computer to execute a process includes:
  an inputting step of receiving an input of data, as learning purpose data and determination target data, in which requests made to a server by a user are represented in a time series;
  a classifying step of classifying, for each user who made the requests, the data received at the inputting step;
  a learning step of extracting, from the learning purpose data classified at the classifying step, the first number of consecutive requests as feature values of the learning purpose data, performing learning by using the feature values of the learning purpose data, and creating a profile for each user; and
  a determination step of extracting, from the determination target data classified at the classifying step, the first number of consecutive requests as feature values of the determination target data and determining, based on the feature values of the determination target data and based on the profiles created at the learning step, whether the determination target data is abnormal.

Advantageous Effects of Invention

According to the present invention, it is possible to detect abnormal behaviors of users or impersonation of users.

BRIEF DESCRIPTION OF DRAWINGS

FIG. 6 is a diagram illustrating an example of a method of extracting feature values performed by the analysis device according to the first embodiment.

FIG. 7 is a diagram illustrating an example of a method of extracting feature values performed by the analysis device according to the first embodiment.

FIG. 11 is a diagram illustrating an example of a method of creating an average profile performed by the analysis device according to the second embodiment.

FIG. 12 is a flowchart illustrating the flow of a learning process performed by the analysis device according to the second embodiment.

FIG. 14 is a diagram illustrating an example of a method of extracting feature values performed by the analysis device according to the third embodiment.

FIG. 15 is a diagram illustrating an example of a method of extracting feature values performed by the analysis device according to the third embodiment.

DESCRIPTION OF EMBODIMENTS

Preferred embodiments of an analysis device, an analysis method, and an analysis program according to the present invention will be described in detail below with reference to the accompanying drawings. Furthermore, the present invention is not limited to the embodiments. Furthermore, each of the embodiments can appropriately be used in any appropriate combination.

First Embodiment

First, the configuration, the flow of processes, and effects of the analysis device according to the first embodiment will be described.

Configuration of the First Embodiment

Figures 1, 2:
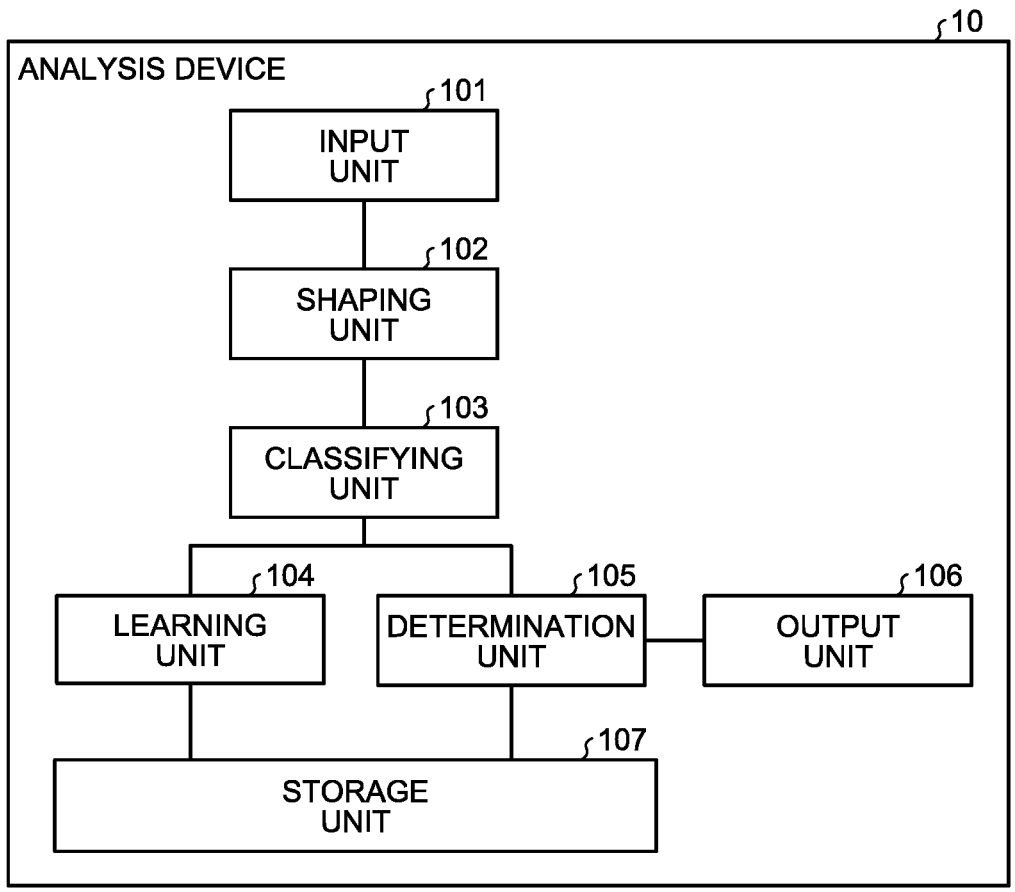
FIG. 1 is a diagram illustrating an example of the configuration of an analysis device according to a first embodiment.
FIG. 2 is a diagram illustrating an example of access logs input to the analysis device according to the first embodiment.

First, the configuration of the analysis device according to the first embodiment will be described with reference to FIG. 1. FIG. 1 is a diagram illustrating an example of the configuration of the analysis device according to the first embodiment. As illustrated in FIG. 1, an analysis device 10 includes an input unit 101, a shaping unit 102, a classifying unit 103, a learning unit 104, a determination unit 105, an output unit 106, and a storage unit 107.

The processes performed by the analysis device 10 can be divided into a learning phase and a determination phase. In the learning phase, profiles are created based on input access logs. In the determination phase, determination of the access logs is performed by using the profiles created in the learning phase. First, the process performed, in the learning phase, by each of the functioning units in the analysis device 10 will be described.

(Learning Phase)

The input unit 101 receives data, as learning purpose data, in which requests made to a server by a user are represented in a time series. The format of inputting the data to be input to the input unit 101 is data that is obtained by capturing a packet of the communication content exchanged with a server or is access logs to a server.

Furthermore, in the data that is input to the input unit 101, information, such as the time, a request, a session ID, the source IP address, needed to construct request information for each user may be included. In the embodiment, it is assumed that access logs are input to the input unit 101 and the access logs that are input to the input unit 101 will be described with reference to FIG. 2. FIG. 2 is a diagram illustrating an example of access logs input to the analysis device according to the first embodiment.

As illustrated in FIG. 2, in each of the access logs, for example, the source IP address, the date and time, and a request are included. From among the access logs on the server illustrated in FIG. 2, the access log of No. 1 indicates that a request of "GET /index.html" was made from the IP address of "192.168.0.1" to the server on "11/Nov/2015 at 09:00:00".

Furthermore, a method of providing input data to the input unit 101 may be performed by using a batch process that collectively passes logs in a plurality of lines or by using a real time process that passes a log for each line and performs a process each time. In the following, a description will be given of a case, as an example, in which input data is provided to the input unit 101 by a batch process; however, the process may also be performed by using a real time process.

The shaping unit 102 excludes, from among pieces of data received by the input unit 101, data that satisfies a predetermined condition and, furthermore, edits the data, which was not excluded, by using a predetermined process. Specifically, the shaping unit 102 removes data that satisfies a certain condition from the access logs. The shaping unit 102 may also remove, for example "data that matches regular expression '.*\jpg$|.*\.gif$'". In this case, a request that ends with ".jpg" or ".gif", i.e., a request about acquiring a picture file can be removed. Consequently, a request that is automatically acquired by a browser, such as a request for acquiring a picture file, can be removed and only the request about a behavior of a user can be extracted as a processing target, which makes it possible to improve the accuracy of analyzing behaviors.

Furthermore, the shaping unit 102 may also perform the following processes i) to iii) on a request. Consequently, it is possible to perform behavior analysis associated with the configuration of a site and, thus, an improvement in the accuracy of analysis of behaviors can be expected.

i) Normalize a path at a hierarchy . . . normalize the path hierarchy divided by "/" in an URL at a previously defined hierarchy.

Figure 3:
FIG. 3 is a diagram illustrating an example of a method of classifying the access logs in the analysis device according to the first embodiment.

Example) A case of normalizing at a third hierarchy: /news/domestic/sports/soccer/index.html⇒/news/domestic/sports ii) Substitution based on regular expression . . . substitute an URL for the pattern of the specified regular expression.
Example) A case of substituting the numeric value with three or more digits for "%NUM": /foo/bar/abc20151101⇒/foo/bar/abc%NUM
iii) Removal of a query string . . . delete the parameter after "?" in an URL
Example) /foo/bar/index.html?id-taro&info=xyz⇒/foo/bar/index.html The classifying unit 103 classifies the data received by the input unit 101 for each user who made the requests. Specifically, the classifying unit 103 classifies access logs received by the input unit 101 for each user who generates the access logs and constructs request information. Furthermore, if the access logs are being shaped by the shaping unit 102, the classifying unit 103 classifies the data edited by the shaping unit 102 for each user who made the requests. As illustrated in FIG. 3, the classifying unit 103 assumes that, for example, the requests made from the same user have the same IP address and then classifies the access logs for each source IP address. FIG. 3 is a diagram illustrating an example of a method of classifying the access logs performed by the analysis device according to the first embodiment.

As illustrated in FIG. 3, from among the access logs to the server, because the access logs of No. 1, 3, and 4 have the source IP address of "192.168.0.1", the classifying unit 103 determines that the access logs of No. 1, 3, and 4 are the access logs of the same user and then classifies the access logs as the request information on the user having the source IP of 192.168.0.1.

Furthermore, as illustrated in FIG. 3, from among the access logs on the server, because the access logs of No. 2 and 5 have the source IP address of "192.168.0.2", the classifying unit 103 determines that the access logs of No. 2 and 5 are the access logs of the same user and then classifies the access logs as request information on the user having the source IP of 192.168.0.2.

Figure 4:
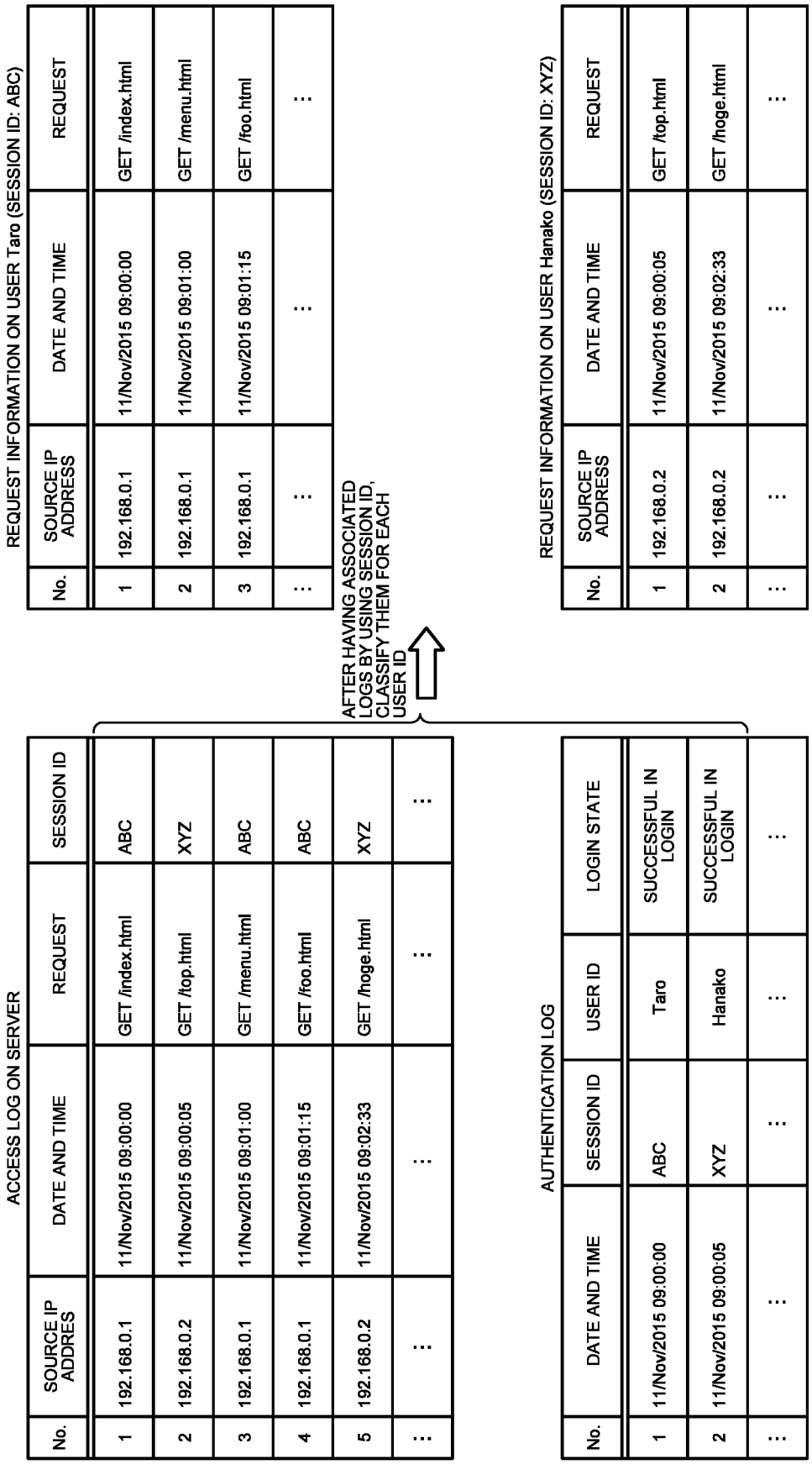
FIG. 4 is a diagram illustrating an example of a method of classifying the access logs in the analysis device according to the first embodiment.

Furthermore, for example, as illustrated in FIG. 4, the classifying unit 103 may also associate authentication logs or the like in which the user IDs are identified with access logs and then classify the access logs for each user ID. FIG. 4 is a diagram illustrating an example of a method of classifying the access logs performed by the analysis device according to the first embodiment. In this case, it is assumed that, in each of the access logs on the server, a source IP address, the date and time, a request, and a session ID are included. Furthermore, it is assumed that, in each of the authentication logs, the date and time, a session ID, a user ID, and a login state are included.

For example, the access log of No. 1 from among the access logs on the server illustrated in FIG. 4 indicates that the request of "GET /index.html" was made to the server from the IP address of "192.168.0.1" by the session with the session ID of "ABC" on "11/Nov/2015 at 09:00:00".

Furthermore, the authentication log of No. 1 from among the authentication logs illustrated in FIG. 4 indicates that the user with the user ID of "Taro" was successful in login by the session with the session ID of "ABC" on "11/Nov/2015 at 09:00:00".

At this time, the classifying unit. 103 associates authentication logs with the access logs based on the session ID and then classifies the access logs for each user ID. For example, as illustrated in FIG. 4, the classifying unit 103 classifies the access log with the session ID of "ABC" as the request information on the user whose ID is Taro. Furthermore, the classifying unit 103 classifies the access log with the session ID of "XYZ" as the request information on a user whose ID is Hanako.

The learning unit 104 extracts, from among pieces of learning purpose data classified by the classifying unit 103, consecutive n requests as feature values of the learning purpose data, performs learning by using the feature values of the learning purpose data, and creates a profile for each user.

Figure 5:
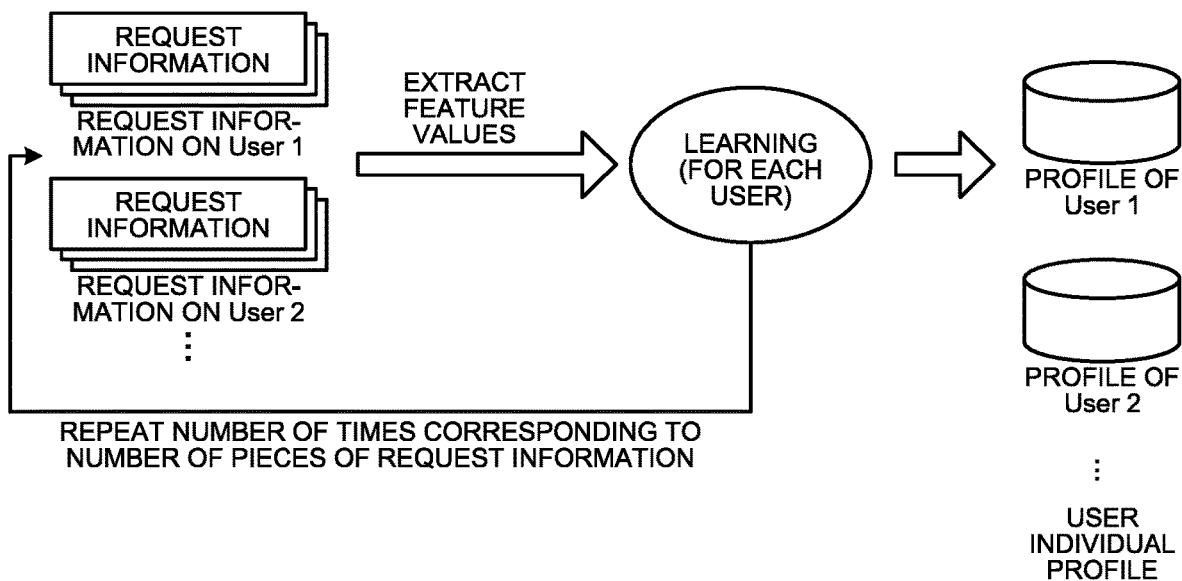
FIG. 5 is a diagram illustrating, in outline, a learning method of the analysis device according to the first embodiment.

The learning unit 104 extracts the feature values from the access logs that were classified for each user by the classifying unit 103, performs learning by using the feature values, and creates a profile for each user. The learning unit 104 extracts, as illustrated in FIG. 5, the feature values from the access logs classified for each user by the classifying unit 103, i.e., the request information on each user; performs learning for each user; and creates individual profiles of users. FIG. 5 is a diagram illustrating, in outline, a learning method of the analysis device according to the first embodiment.

The learning unit 104 extracts, as illustrated in FIG. 6, for example, the transition order of pages as the feature values. FIG. 6 is a diagram illustrating an example of a method of extracting feature values performed by the analysis device according to the first embodiment. As illustrated in FIG. 6, if the transition order of pages are extracted as the feature values, the learning unit 104 uses the consecutive n requests as the feature values.

For example, the learning unit 104 extracts, as n=2, the requests of No. 1 and No. 2 (GET /page1 and GET /page2), the requests of No. 2 and No. 3 (GET /page2 and GET /page3), the requests of No. 3 and No. 4 (GET /page3 and GET /page4), and the like as the feature values.

Furthermore, the learning unit 104 extracts, as illustrated in FIG. 7, for example, transition time intervals of pages as the feature values. FIG. 7 is a diagram illustrating an example of a method of extracting feature values performed by the analysis device according to the first embodiment. As illustrated in FIG. 7, if the transition time intervals of pages are extracted as the feature values, the learning unit 104 uses the consecutive n requests and the time intervals as the feature value.

For example, the learning unit 104 extracts, as n=2, the requests of No. 1 and No. 2 and the time intervals (GET /page1, GET /page2, and 60 s), the requests of No. 2 and No. 3 and the time intervals (GET /page2, GET /page3, and 15 s), the requests of No. 3 and No. 4 and the time intervals (GET /page3, GET /page4, and 55 s), and the like as the feature values.

Furthermore, the feature values extracted by the learning unit 104 are not limited to the transition order of pages and the transition time intervals of pages may also be, for example, the number of types of pages appearing in the requests. Furthermore, the learning unit. 104 may also use a plurality of feature values in combination.

For example, when the learning unit 104 extracts the transition order of pages as the feature values, the learning unit 104 may also further count the number of each of the extracted feature values and use the counted number as new feature values. Furthermore, the learning unit 104 may also use presence or absence of the feature values for each of the extracted feature values represented by I/O as feature values. Furthermore, the learning unit 104 may also use, at transition time intervals of pages, the values of the time intervals as the feature values without processing anything or may also use the average value of the transition time between a plurality of requests as feature values.

The learning unit 104 gives the extracted feature values to the algorithm of machine learning, performs learning in accordance with the algorithm, creates or updates a profile for each user, and stores the profiles in the storage unit 107.

The algorithm of the machine learning used for the learning may be performed by an existing machine learning library, such as Jubatus (a reference: jubat.us or scikit-learn (a reference: scikit-learn.org), and any method may be used. For example, when using the algorithm of a classifier, the learning unit 104 performs learning on the feature values of a certain user (User 1) as the data to be classified as the user of the "User 1" and stores the created learning model in the storage unit 107 as an individual profile of the user 1.

(Determination Phase)

In the determination phase, the input unit 101, the shaping unit 102, and the classifying unit 103 perform the same processes as those performed in the learning phase and construct request information. Furthermore, the determination unit 105 extracts, similarly to the learning unit 104, feature values from the request information on the determination target. The determination unit 105 determines, in accordance with the algorithm of the machine learning, by using the user individual profile of the subject user stored in the storage unit 107, whether the input access log is abnormal that deviates from the profile of the subject user.

The input unit 101 receives, as determination target data, an input of data in which requests made to the server by a user are represented in a time series. Furthermore, in the determination phase, the access log of the determination target input to the input unit 101 may also be the access logs that are input in the learning phase or the access logs that are not input in the learning phase. For example, in the determination phase, in the input unit 101, the access logs on the day on which determination is performed are input, whereas, in the learning phase, the access logs stored until the day before the day on which determination is performed are input.

The determination unit 105 extracts, from among the pieces of determination target data classified by the classifying unit 103, the consecutive n requests as the feature values of the determination target data and determines, based on the feature values of the determination target data and the profiles created by the learning unit 104, whether the determination target data is abnormal. Then, the output unit 106 outputs the determination result obtained by the determination unit 105. Furthermore, any type or method may be used for the algorithm of the machine learning used by the determination unit 105, similarly to the learning unit 104.

Process Performed in the First Embodiment

Figure 8:
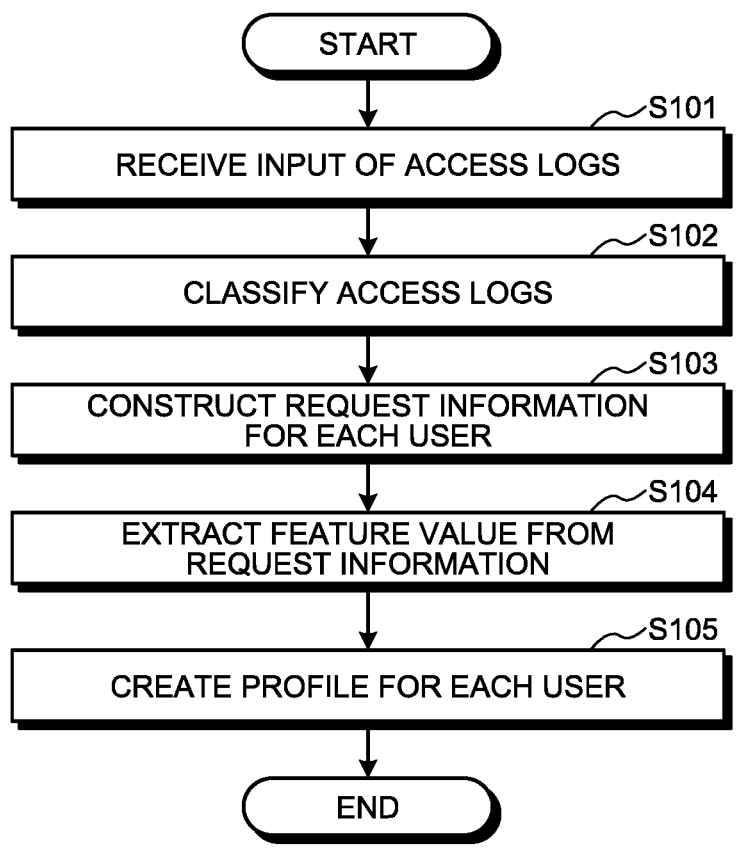
FIG. 8 is a flowchart illustrating the flow of a learning process performed by the analysis device according to the first embodiment.

A learning process performed in the learning phase by the analysis device 10 will be described with reference to FIG. 8. FIG. 8 is a flowchart illustrating the flow of the learning process performed by the analysis device according to the first embodiment. As illustrated in FIG. 8, first, the input unit 101 receives an input of access logs (Step S101).

Then, the classifying unit 103 classifies the access logs for each user (Step S102) and constructs request information for each user (Step S103). Then, the learning unit 104 extracts feature values from the request information (Step S104), performs learning based on the extracted feature values, and creates a profile for each user (Step S105).

Figure 9:
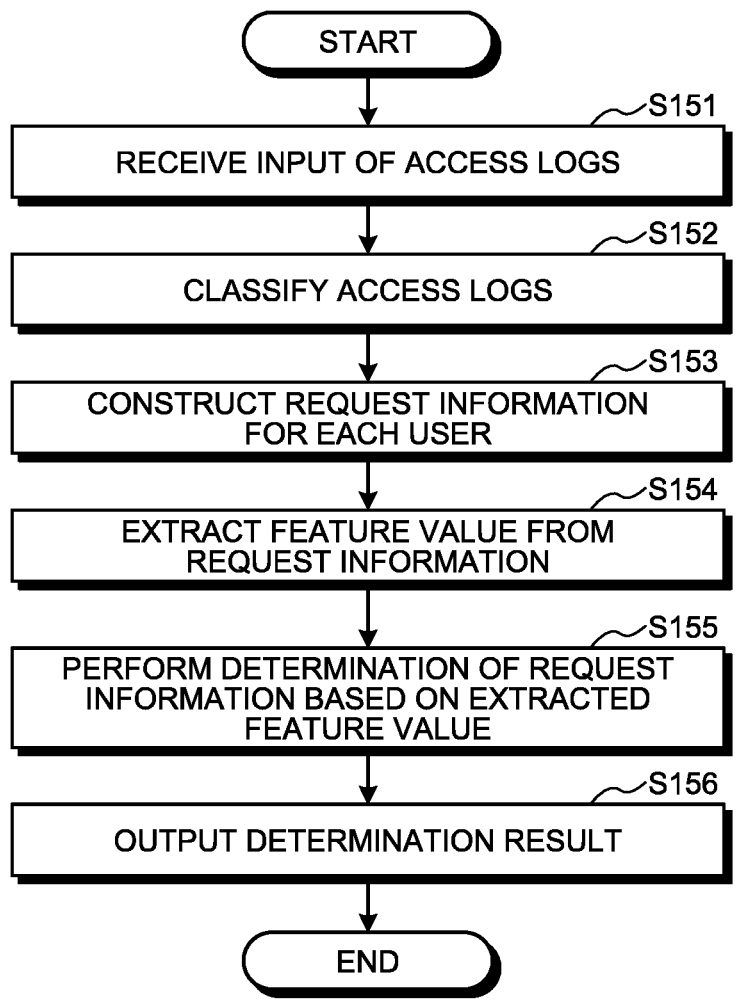
FIG. 9 is a flowchart illustrating the flow of a determination process performed by the analysis device according to the first embodiment.

A determination process in the determination phase performed by the analysis device 10 will be described with reference to FIG. 9. FIG. 9 is a flowchart illustrating the flow of the determination process performed by the analysis device according to the first embodiment. As illustrated in FIG. 9, first, the input unit 101 receives an input of access logs (Step S151).

Then, the classifying unit 103 classifies the access logs for each user (Step S152) and constructs request information for each user (Step S153). Then, the determination unit 105 extracts feature values from the request information (Step S154) and performs, based on the extracted feature values, determination of the request information by using the profile for each user created in the learning process (Step S155). Then, the output unit 106 outputs the determination result (Step S156).

Effects in the First Embodiment

The input unit 101 receives, as the learning purpose data and the determination target data, an input of data in which requests made to a server by a user are represented in a time series. Furthermore, the classifying unit 103 classifies the data received by the input unit 101 for each user who made the requests. Then, the learning unit 104 extracts, from the learning purpose data classified by the classifying unit 103, consecutive n requests as the feature values of the learning purpose data; performs learning by using the feature values of learning purpose data; and creates a profile for each user. Furthermore, the determination unit 105 extracts, from the determination target data classified by the classifying unit 103, consecutive n requests as feature values of the determination target data; and determines, based on the feature values of the determination target data and based on the profiles created by the learning unit 104, whether the determination target data is abnormal.

Consequently, for example, because the behavior of the user of the determination target can be compared with a user individual profile obtained by performing the learning of the past behaviors of the subject user, it is possible to detect an abnormal behavior of a user or impersonation of a user.

Furthermore, the shaping unit 102 excludes, from among pieces of data received by the input unit 101, the data that satisfies a predetermined condition and, furthermore, edits the data, which was not excluded, by using a predetermined process. Then, the classifying unit 103 classifies the data edited by the shaping unit 102 for each user who made the requests. Consequently, it is possible to extract only the requests related to the behaviors of a user as the processing targets, thus improving the analysis accuracy.

Second Embodiment

In the first embodiment, user individual profiles are created and determination of the access logs was performed by using the created user individual profiles. In contrast, in a second embodiment, an average profile of all of the users is created based on the user individual profiles and determination of abnormal user is performed based on the average profile of all of the users.

Configuration in the Second Embodiment

The analysis device 10 according to the second embodiment includes the same functioning units as those included in the analysis device 10 according to the first embodiment. Furthermore, the process performed by the analysis device 10 according to the second embodiment can be divided into, similarly to the first embodiment, a learning phase and a determination phase.

(Learning Phase)

Figure 10:
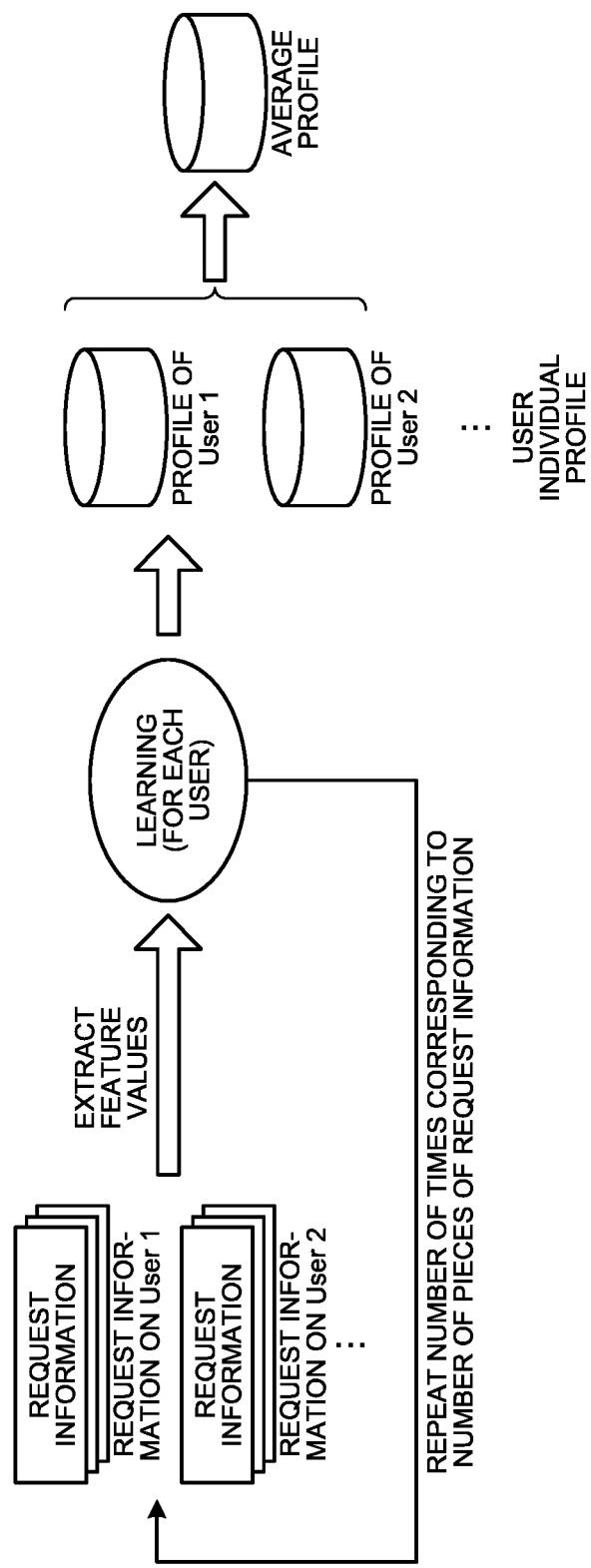
FIG. 10 is a diagram illustrating, in outline, a learning method performed by an analysis device according to a second embodiment.

In the second embodiment, in the learning phase, the processes performed by the input unit 101, the shaping unit 102, and the classifying unit 103 are the same as those performed in the first embodiment. Furthermore, the learning unit 104 extracts, as illustrated in FIG. 10, feature values from the access logs classified for each user by the classifying unit 103, i.e., the request information on each user; performs learning for each user; and creates user individual profiles. FIG. 10 is a diagram illustrating, in outline, the learning method performed by the analysis device according to the second embodiment. Furthermore, the learning unit 104 creates an average profile based on the user individual profiles and stores the created average profile in the storage unit 107.

A method of creating the average profile from individual profiles performed by the learning unit 104 is different in accordance with the algorithm of the machine learning to be used or the format of the profile. For example, if the profiles are data formed of a probability of occurrence for each feature value, the learning unit 104 calculates an average value of all of the users of the probability of occurrence of each of the feature values included in the profile for each user and further creates an average profile in which the calculated average value is used as the probability of occurrence of each of the feature values.

Specifically, as illustrated in FIG. 11, the learning unit 104 may also calculate, regarding all of the individual profiles, an average of the probability of occurrence for each feature value and set the obtained result as an average profile. FIG. 11 is a diagram illustrating an example of a method of creating the average profile performed by the analysis device according to the second embodiment.

In the example illustrated in FIG. 11, for example, the probability of occurrence of a feature value A of the profile of the User 1 is 20% and the probability of occurrence of the feature value A of the profile of a User 2 is 4%. Here, because the average of the probability of occurrence of each profile of the feature value A is 12%, the learning unit 104 sets the probability of occurrence of the feature value A of the average profile to 12%.

(Determination Phase)

In the determination phase, the input unit 101, the shaping unit 102, and the classifying unit 103 perform the same processes as those performed in the learning phase and construct request information. Furthermore, the determination unit 105 extracts, similarly to the learning unit 104, feature values from the request information on the determination target. The determination unit 105 determines, in accordance with the algorithm of the machine learning, by using the average profile stored in the storage unit 107, whether the input access log deviates from the average profile. The determination unit 105 determines, for example, that the access log that deviates from the average profile by an amount equal to or greater than a predetermined is abnormal.

Then, the output unit 106 outputs the determination result obtained by the determination unit 105. Furthermore, any type or method may be used for the algorithm of the machine learning used by the determination unit 105, similarly to the learning unit 104.

Process Performed in the Second Embodiment

A learning process performed in the learning phase by the analysis device 10 will be described with reference to FIG. 12. FIG. 12 is a flowchart illustrating the flow of the learning process performed by the analysis device according to the second embodiment. As illustrated in FIG. 12, first, the input unit 101 receives an input of access logs (Step S201).

Then, the classifying unit 103 classifies the access logs for each user (Step S202), and constructs request information for each user (Step S203). Then, the learning unit 104 extracts feature values from the request information (Step S204), performs learning based on the extracted feature values, and creates a profile for each user (Step S205). Furthermore, the learning unit 104 creates an average profile based on the profile for each user (Step S206).

Effects in the Second Embodiment

The learning unit 104 calculates an average value of all of the users of the probability of occurrence of each feature value included in the profile for each user and further creates an average profile in which the calculated average value is used as the probability of occurrence of each feature value. Consequently, it is possible to compare the behavior of the user of the determination target with the average profile and it is possible to detect, as an abnormal user, the user whose behavior significantly deviates from the majority.

Furthermore, similarly to the first embodiment, the shaping unit 102 can exclude, from among pieces of data received by the input unit 101, the data that satisfies a predetermined condition and, furthermore, edit the data, which was not excluded, by using a predetermined process. In this case, the classifying unit 103 classifies the data edited by the shaping unit 102 for each user who made the requests. Consequently, it is possible to extract only the requests that are related to the behavior of a user as the processing targets, thus improving the analysis accuracy.

Third Embodiment

In the first embodiment, when performing determination, the request information constructed from the input access logs is analyzed at a time. In contrast, in a third embodiment, by analyzing the request information included in a sliding window having a predetermined window size, it is possible to perform analysis in accordance with a time series.

Configuration in the Third Embodiment

The analysis device 10 according to the third embodiment includes the same functioning units as those included in the analysis device 10 according to the first embodiment. Furthermore, the process performed by the analysis device 10 according to the third embodiment can be divided into, similarly to the first embodiment, a learning phase, and a determination phase.

(Learning Phase)

In the third embodiment, the processes performed in the learning phase are the same as those performed in the first embodiment or the second embodiment. After the end of the learning phase, in the storage unit 107, the user individual profiles or the average profile of all of the users are stored.

(Determination Phase)

In the determination phase, the input unit 101, the shaping unit 102, and the classifying unit 103 perform the same processes as those performed in the learning phase and construct, request information. Furthermore, the determination unit 105 extracts, similarly to the learning unit 104, the feature values from the request information that is the determination target.

The determination unit 105 extracts, by using each request in the determination target data classified by the classifying unit 103 as a starting point, for each consecutive w requests, consecutive n requests as the feature values of the determination target data; calculates scores for each of the consecutive w requests based on the feature values of the determination target data and based on the profiles created by the learning unit 104; and determines whether the determination target data is abnormal based on an amount of change in the scores in a time series and a threshold.

Figure 13:
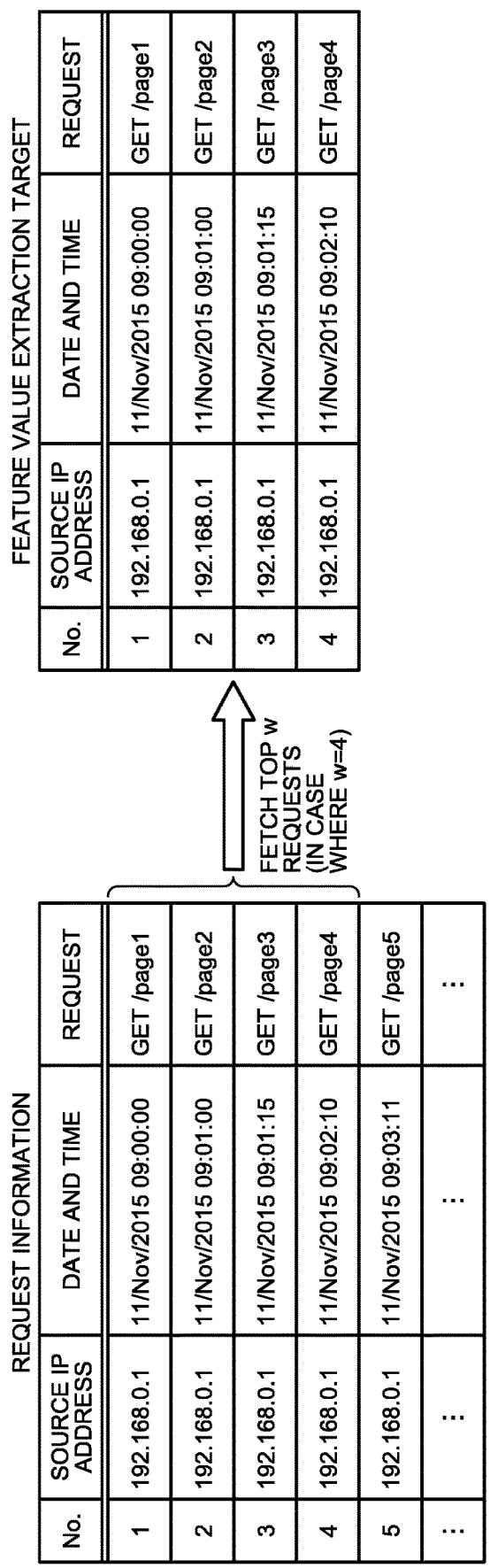
FIG. 13 is a diagram illustrating an example of a method of extracting feature values performed by an analysis device according to a third embodiment.

Specifically, in the third embodiment, unlike the first embodiment and the second embodiment, instead of analyzing request information at a time at the time of determination, first, the determination unit 105 performs analysis, as illustrated in FIG. 13, by sequentially shifting the analysis target by one, such as analyzing the $1^{st}$ to $w^{th}$ requests and then analyzing the $2^{nd}$ to the $w+1^{th}$ requests . . . , and performs determination based on the variation in the analysis results. FIG. 13 is a diagram illustrating an example of the method of extracting feature values performed by the analysis device according to the third embodiment.

Consequently, for example, it is possible to specify the time point at which the occurrence of impersonation is suspected. Furthermore, the region of the request information of the analysis target is referred to as a sliding window and w is referred to as a window size.

The determination unit 105 fetches, as illustrated in FIG. 13, for example, as w=4, four pieces of request information at a time. Then, as illustrated in FIG. 14, the determination unit 105 extracts the feature values from the fetched four pieces of request information. FIG. 14 is a diagram illustrating an example of the method of extracting feature values performed by the analysis device according to the third embodiment. Furthermore, the method of extracting the feature values is the same as that performed in the first embodiment and the second embodiment.

FIG. 14 indicates the example of a case where the determination unit 105 extracts the transition order of pages as the feature values from the four pieces of request information. At this time, the determination unit 105 uses the consecutive two requests as the feature values and extracts, for example, the requests of No. 1 and No. 2 (GET /page1 and GET /page2), the requests of No. 2 and No. 3 (GET /page2 and GET /page3), and the requests of No. 3 and No. 4 (GET /page3 and GET /page4).

Furthermore, as illustrated in FIG. 15, after having extracted the feature values from w pieces of request information the determination unit 105 deletes the $1^{st}$ request information and fetches, if w or more pieces of request information still remains, the $1^{st}$ to $w^{th}$ request information. FIG. 15 is a diagram illustrating an example of the method of extracting feature values performed by the analysis device according to the third embodiment. Then, the determination unit 105 repeats the process until the number of remaining pieces of request information is less than w.

Furthermore, in accordance with the algorithm of the machine learning, the determination unit 105 calculates, as scores, the degree of deviation of the extracted feature values from the user individual profiles for each sliding window or from an average profile of all of the users; checks a variation in the scores in accordance with a time series; and determines that the time point at which the score exceeds a predetermined threshold as the time point at which impersonation has occurred. Then, the output unit 106 outputs the determination results obtained by the determination unit 105. If, for example, the variation in the scores in a time series exceeds the threshold, the determination unit 105 determines that the determination target data is abnormal. Furthermore, similarly to the learning unit 104, any type or method may be used for the algorithm of the machine learning used by the determination unit 105.

Process Performed in the Third Embodiment

Figure 16:
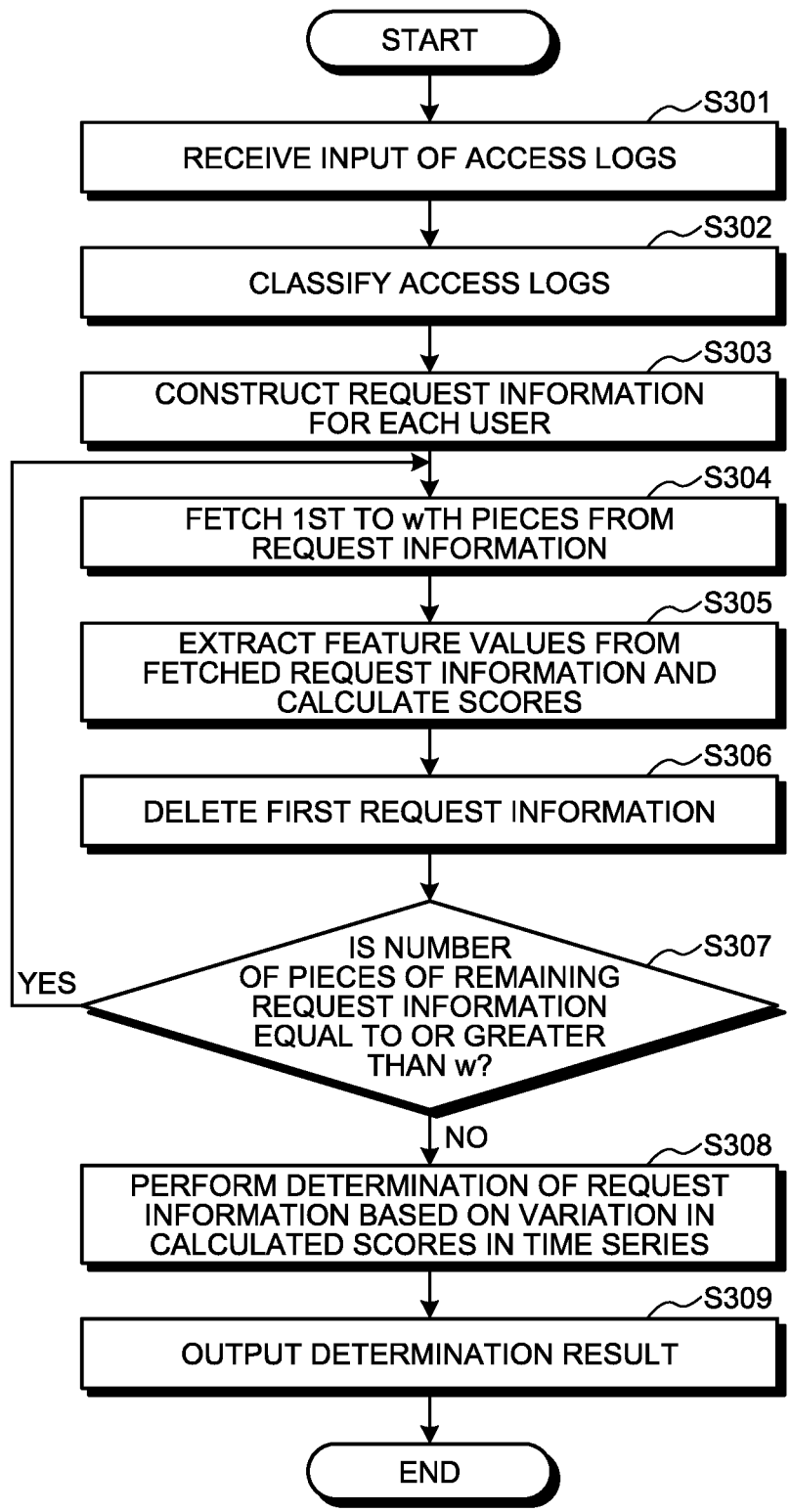
FIG. 16 is a flowchart illustrating the flow of a determination process performed by the analysis device according to the third embodiment.

The determination process performed in the determination phase by the analysis device 10 will be described with reference to FIG. 16. FIG. 16 is a flowchart illustrating the flow of the determination process performed by the analysis device according to the third embodiment. As illustrated in FIG. 16, first, the input unit 101 receives an input of access logs (Step S301).

Then, the classifying unit 103 classifies the access logs for each user (Step S302) and constructs request information for each user (Step S303). Then, the classifying unit 103 fetches, from among the pieces of request information, the $1^{st}$ to $w^{th}$ request information (Step S304), extracts feature values from the fetched request information, and calculates scores by comparing the request information with the profiles (Step S305). Then, the determination unit 105 deletes the $1^{st}$ request information, i.e., the top request information (Step 3306).

At this time, if the number of pieces of remaining request information is equal to or greater than w (Yes at Step S307), the determination unit 105 further fetches, from among the pieces of request information, the $1^{st}$ to $w^{th}$ request information (Step S304) and repeats the process. Furthermore, if the number of pieces of remaining request information is not equal to or greater than w (No at Step 3307), the determination unit 105 determines the request information based on the variation in scores in a time series calculated before now (Step S308). Then, the output unit 106 outputs the determination result (Step S309).

Effects in the Third Embodiment

The determination unit 105 extracts, by using each request in the determination target data classified by the classifying unit 103 as a starting point, for each of consecutive w requests, consecutive n requests as the feature values of the determination target data; calculates score for each consecutive w requests based on the feature values of the determination target data and based on the profiles created by the learning unit 104; and determines whether the determination target data is abnormal based on an amount of change in the scores in a time series and based on the threshold. Consequently, because it is possible to analyze a variation in a certain user in a time series, which makes it possible to specify the time point at which impersonation or abnormality has occurred.

Furthermore, the determination unit 105 may also use the variation in the scores in a time series without processing anything or may also determine, by taking a moving average of an amount of change in scores in a time series in a predetermined time period, if the moving average exceeds a threshold, that the determination target data is abnormal. Consequently, it is possible to restrain a user who temporarily acts an abnormal behavior or the like from erroneously being detected as an abnormal user.

Furthermore, similarly to the first embodiment, the shaping unit 102 can exclude data that satisfies a predetermined condition from among the pieces of data received by the input unit 101 and can further edit the data, which was not excluded, by using a predetermined process. In this case, the classifying unit 103 classifies the data edited by the shaping unit 102 for each user who made the requests. Consequently, it is possible to extract only the requests related to behavior of users as the processing targets, thus improving the analysis accuracy.

Fourth Embodiment

In the third embodiment, at the time of determination, a variation in scores is checked in a time series and it is determined that the time point at which the score exceeds the predetermined threshold is the time point at which impersonation has occurred. In contrast, in a fourth embodiment, the threshold is automatically calculated.

Configuration in the Fourth Embodiment

Figure 17:
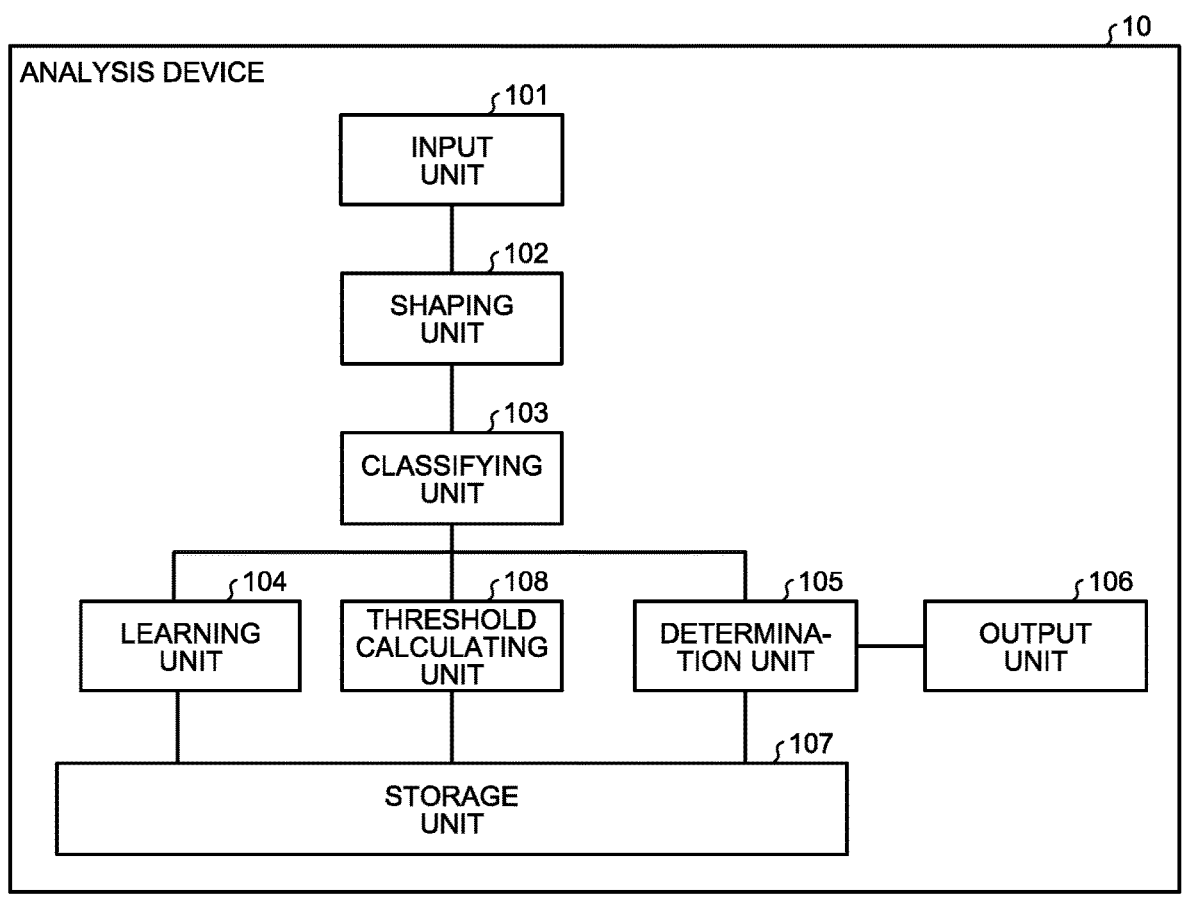
FIG. 17 is a diagram illustrating an example of the configuration of an analysis device according to a fourth embodiment.

As illustrated in FIG. 17, the analysis device 10 according to the fourth embodiment includes, in addition to the same functioning units included in the analysis device 10 according to the third embodiment, a threshold calculating unit 108. FIG. 17 is a diagram illustrating an example of the configuration of the analysis device according to the fourth embodiment. Furthermore, regarding the processes performed by the analysis device 10 according to the fourth embodiment, in addition to the same learning phase and the determination phase performed in the third embodiment, a threshold calculation phase is present.

(Learning Phase)

In the fourth embodiment, the process in the learning phase is the same as that performed in the third embodiment. After the end of the learning phase, in the storage unit 107, user individual profiles or the average profile of all of the users are stored.

(Determination Phase)

The process in the determination phase according to the fourth embodiment is the same as that performed in the third embodiment. However, in the third embodiment, a previously defined threshold is compared with a score; however, in the fourth embodiment, the threshold calculated in the threshold calculation phase is compared with a score. The process in the threshold calculation phase will be described.

(Threshold Calculation Phase)

In the threshold calculation phase, as threshold calculation purpose data, the input unit 101 further receives an input of data in which requests made to the server by a user are represented in a time series. Furthermore, the classifying unit 103 classifies, for each user who made the requests, the threshold calculation purpose data received by the input unit 101. Then, by using each request in threshold calculation purpose data classified by the classifying unit 103 as a starting point, the threshold calculating unit 108 extracts, for each of consecutive w requests, consecutive n requests as the feature values of the threshold calculation purpose data; calculates score of for each of consecutive w requests based on the feature values of the threshold calculation purpose data and based on the profiles created by the learning unit 104; and calculates a threshold based on an amount of change in the scores in a time series.

Specifically, in the threshold calculation phase, the input unit 101 and the classifying unit 103 perform the same processes as those performed in the determination phase described in the third embodiment and construct request information. Furthermore, the threshold calculating unit 108 extracts, similarly to the determination unit 105, the feature values for each of sliding windows from the request information that is the determination target and calculates, as scores, the degree of deviation of the feature values for each of the extracted sliding windows from the user individual profiles. Then, the threshold calculating unit 108 may use the maximum value of the score as a threshold or may use the maximum value of the moving average of the score as the threshold.

Process Performed in the Fourth Embodiment

Figure 18:
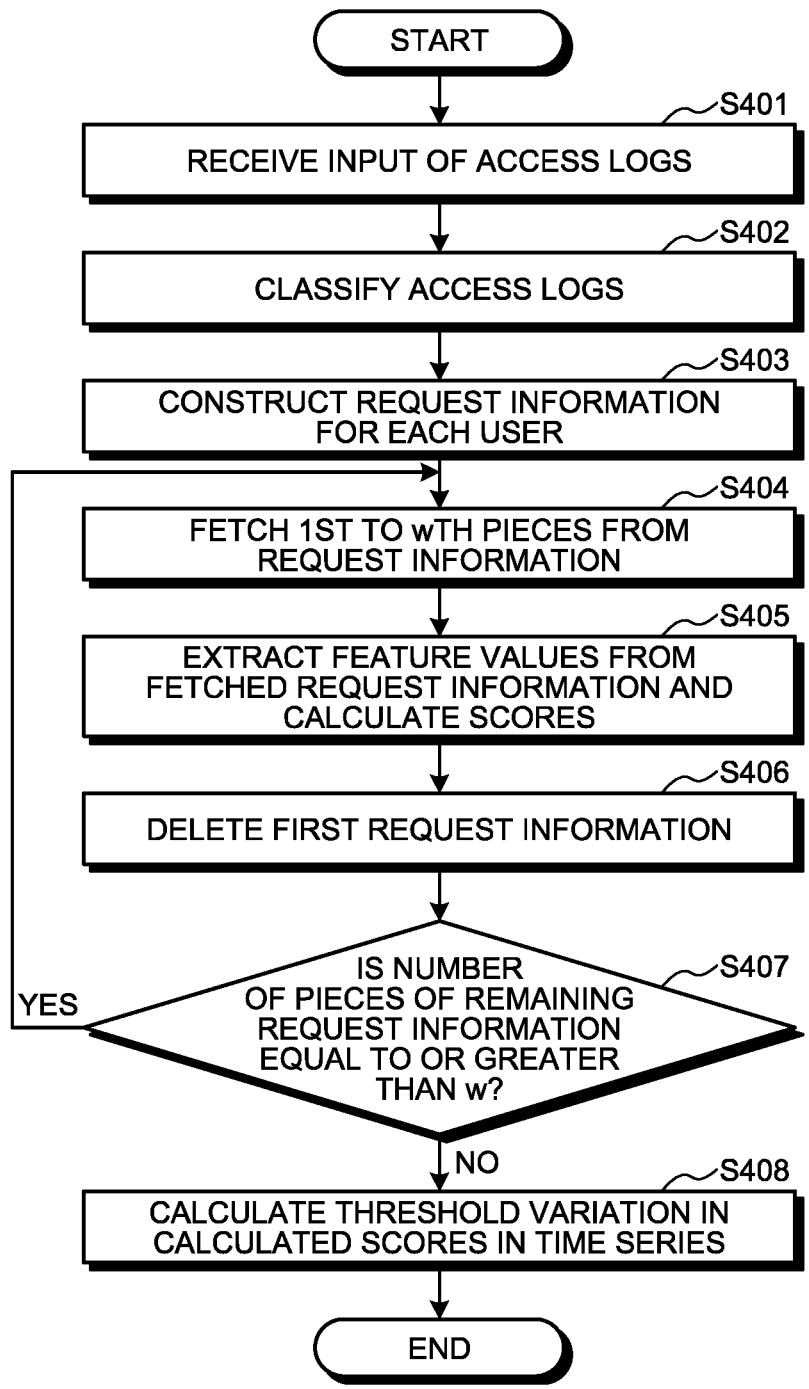
FIG. 18 is a flowchart illustrating the flow of a threshold calculation process performed by the analysis device according to the fourth embodiment.

The threshold calculation process performed in the threshold calculation phase by the analysis device 10 will be described with reference to FIG. 18. FIG. 18 is a flowchart illustrating the flow of the threshold calculation process performed by the analysis device according to the fourth embodiment. As illustrated in FIG. 18, first, the input unit 101 receives an input of access logs (Step S401).

Then, the classifying unit 103 classifies the access logs for each user (Step S402) and constructs request information for each user (Step S403). Then, the threshold calculating unit 108 fetches, from among the pieces of request information, the $1^{st}$ to $w^{th}$ request information (Step S404); extracts the feature values from the fetched request information; and calculates scores based on comparison with the profiles (Step S405). Then, the threshold calculating unit 108 deletes the $1^{st}$ request information, i.e., the top request information (Step S406).

At this time, if the number of remaining pieces of request information is equal to or greater than w (Yes at Step S407), the threshold calculating unit 108 further fetches, from among the pieces of request information, the $1^{st}$ to $w^{th}$ request information (Step S404) and repeats the process. Furthermore, if the number of remaining pieces of request information is not equal to or greater than w (No at Step S407), the threshold calculating unit 108 calculates a threshold based on a change in scores that were calculated before now in a time series (Step S408).

Effects in the Fourth Embodiment

The input unit 101 further receives, as threshold calculation purpose data, an input of data in which requests made to the server by a user are represented in a time series. Furthermore, the classifying unit 103 classifies, for each user who made the requests, the threshold calculation purpose data that was received by the input unit 101. Then, the threshold calculating unit 108 extracts, by using each request in the threshold calculation purpose data classified by the classifying unit 103 as a starting point, for each of consecutive w requests, consecutive n requests as the feature values of the threshold calculation purpose data; calculates scores for each of consecutive w requests based on the feature values of the threshold calculation purpose data and based on the profiles created by the learning unit 104; and calculates the threshold based on an amount of change in scores in a time series. Consequently, it is possible to automatically set the threshold, thus improving the detection accuracy.

Furthermore, similarly to the first embodiment, the shaping unit 102 can exclude the data that satisfies a predetermined condition from among the pieces of data received by the input unit 101 and can further edit data, which was not excluded, by using a predetermined process. In this case, the classifying unit 103 classifies the data edited by the shaping unit 102 for each user who made the requests. Consequently, it is possible to extract only the requests related to behaviors of a user as the processing targets, thus improving the analysis accuracy.

[System Configuration and the Like]

The components of the devices illustrated in the drawings are only for conceptually illustrating the functions thereof and are not always physically configured as illustrated in the drawings. In other words, the specific shape of a separation or integrated device is not limited to the drawings. Specifically, all or part of the device can be configured by functionally or physically separating or integrating any of the units depending on various loads or use conditions. Furthermore, all or any part of each of the processing functions performed by the processing units can be implemented by a central processing unit (CPU) and by programs analyzed and executed by the CPU or implemented as hardware by wired logic.

Of the processes described in the embodiment, the whole or a part of the processes that are mentioned as being automatically performed can also be manually performed, or the whole or a part of the processes that are mentioned as being manually performed can also be automatically performed using known methods. Furthermore, the flow of the processes, the control procedures, the specific names, and the information containing various kinds of data or parameters indicated in the above specification and drawings can be arbitrarily changed unless otherwise stated.

[Program]

As an embodiment, the analysis device can be mounted by installing, in a desired computer, an analysis program that executes the analysis process described above as packaged software or online software. For example, by causing an information processing apparatus to execute the analysis program described above, it is possible to allow the information processing apparatus to function as the analysis device. An example of the information processing apparatus mentioned here includes a desktop or a notebook personal computer. Furthermore, other than this, an example of the information processing apparatus includes a mobile communication terminal, such as smartphone, a mobile phone, or Personal Handyphone System (PHS), and a slate terminal, such as a Personal Digital Assistant (PDA).

Furthermore, the analysis device can also be mounted as a server device, together with a terminal device used by a user as a client, that provides a service related to the analysis process described above to the client. For example, the analysis device is mounted as a server device that provides the analysis service for inputting access logs and outputting profiles for each user. In this case, the analysis device may also be mounted as a Webserver or mounted as a cloud so as to provide a service related to analysis described above by outsourcing.

Figure 19:
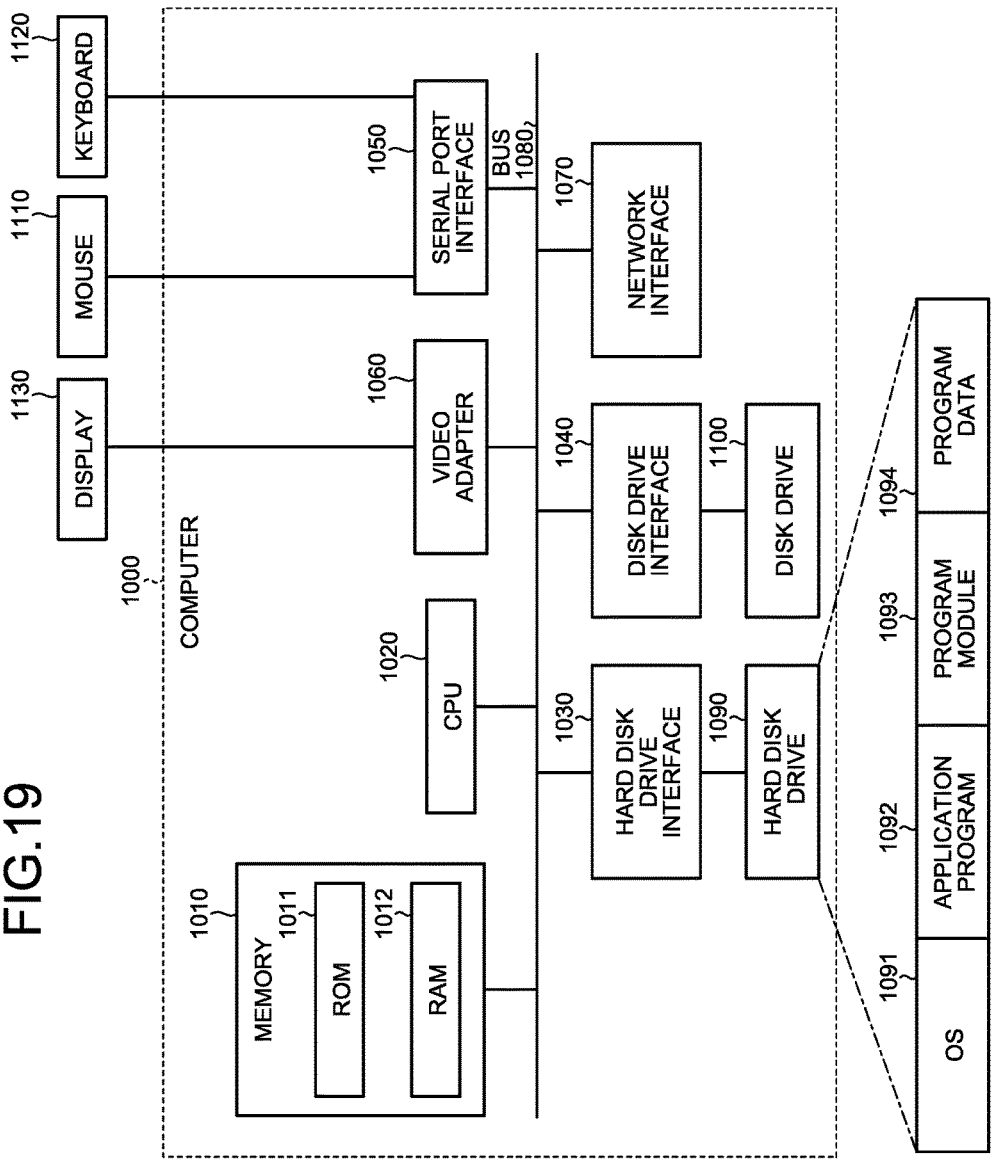
FIG. 19 is a diagram illustrating an example of a computer used to implement the analysis device by executing a program.

FIG. 19 is a diagram illustrating an example of a computer used to implement the analysis device by executing a program. A computer 1000 includes, for example, a memory 1010 and a CPU 1020. Furthermore, the computer 1000 includes a hard disk drive interface 1030, a disk drive interface 1040, a serial port interface 1050, a video adapter 1060, and a network interface 1070. Each of the devices is connected by a bus 1080.

The memory 1010 includes a read only memory (ROM) 1011 and a random access memory (RAM) 1012. The ROM 1011 stores therein a boot program, such as Basic Input Output System (BIOS). The hard disk drive interface 1030 is connected to a hard disk drive 1090. The disk drive interface 1040 is connected to a disk drive 1100. For example, an attachable and detachable storage medium, such as a magnetic disk or an optical disk, is inserted into the disk drive 1100. The serial port interface 1050 is connected to, for example, a mouse 1110 and a keyboard 1220. The video adapter 1060 is connected to, for example, a display 1130.

The hard disk drive 1090 stores therein, for example, an OS 1091, an application program 1092, a program module 1093, and program data 1094. Namely, the program that determines each of the processes performed by the analysis device is installed as the program module 1093 in which codes that can be executed by a computer are described. The program module 1093 is stored in, for example, the hard disk drive 1090. For example, the program module 1093 that is used to execute the same process as that performed by the analysis device having the functional configuration is stored in the hard disk drive 1090. The hard disk drive 1090 may also be replaced by a solid state drive (SSD).

Furthermore, the setting data used in the process performed in the above described embodiment is stored in, as the program data 1094, for example, the memory 1010 or the hard disk drive 1090. Then, the CPU 1020 reads, to the RAM 1012 as needed, the program module 1093 or the program data 1094 stored in the memory 1010 or the hard disk drive 1090.

Furthermore, the program module 1093 and the program data 1094 may also be stored in, instead of the hard disk drive 1090, for example, a removable storage medium and read by the CPU 1020 via the disk drive 1100 or the like. Alternatively, the program module 1093 and the program data 1094 may also be stored in another computer connected via a network (a local area network (LAN), a wide area network (WAN), etc.). Then, the program module 1093 and the program data 1094 may also be read, from the computer, by the CPU 1020 via the network interface 1070.

REFERENCE SIGNS LIST 10 analysis device
101 input unit
102 shaping unit
103 classifying unit
104 learning unit
105 determination unit
106 output unit
107 storage unit
108 threshold calculating unit

The invention claimed is:

1. An analysis device comprising:
a memory; and
a processor coupled to the memory and programmed to execute a process comprising:
receiving an input of data, as learning purpose data and determination target data, in which requests made to a server by a user are represented in a time series;
classifying, for each user who made the requests, the data received by the receiving;
firstly extracting, from the learning purpose data classified by the classifying, (i) n consecutive requests in the learning purpose data, which are consecutive requests to web pages in the learning purpose data, n being a first predetermined number (ii) a transition order of the web pages, and (iii) time intervals for the transitions between the web pages, as feature values of the learning purpose data, that performs learning by inputting the feature values of the learning purpose data to a machine learning algorithm;
creating a profile for each user based on the machine learning algorithm performing learning of feature values for each user;

secondly extracting, from the determination target data classified by the classifying, (i) n consecutive requests in the determination target data, which are consecutive requests to web pages in the determination target data, (ii) a transition order of the web pages, and (iii) time intervals for the transitions between the web pages, as feature values of the determination target data, the secondly extracting including using each request in the determination target data classified by the classifying as a starting point, for each of w consecutive requests in the determination target data, the n consecutive requests as the feature values of the determination target data, where w is a second predetermined number greater than n; and determining as a determination result, based on the feature values of the determination target data and based on the profiles created by the creating, whether the determination target data is abnormal and outputting the determination result when the determination target data is determined to be abnormal, wherein the determining includes calculating scores for each of the w consecutive requests based on the feature values of the determination target data and based on the profiles created by the creating, determining whether the determination target data is abnormal based on an amount of change in the scores in a time series and a threshold, and further determining that a time point at which the score exceeds the threshold as a time point at which impersonation of a user has occurred.

2. The analysis device according to claim 1, wherein the creating calculates an average value of all users of probability of occurrence of each feature value included in the profile for each user and further creates an average profile in which the calculated average value is used as the probability of occurrence of each feature value.

3. The analysis device according to claim 1, wherein
the receiving further receives an input of data, as threshold calculation purpose data, in which requests made to a server by a user are represented in a time series, and
the classifying classifies, for each user who made the requests, the threshold calculation purpose data received by the receiving, and
the analysis device further comprises thirdly extracting, by using each request in the threshold calculation purpose data classified by the classifying as a starting point, for each of the w consecutive requests, the n consecutive requests as the feature values of the threshold calculation purpose data, that calculates scores for each of the w consecutive requests based on the feature values of the threshold calculation purpose data and based on the profiles created by the creating, and calculating the threshold based on an amount of change in the scores in a time series.

4. The analysis device according to claim 1, further comprising excluding data that satisfies a predetermined condition from among the pieces of data received by the receiving and editing data, which was not excluded, by using a predetermined process, wherein
the classifying classifies, for each user who made the requests, the data edited by the editing.

5. An analysis method performed by an analysis device, the analysis method comprising:

an inputting step of receiving an input of data, as learning purpose data and determination target data, in which requests made to a server by a user are represented in a time series;

a classifying step of classifying, for each user who made the requests, the data received at the inputting step;

a learning step of extracting, from the learning purpose data classified at the classifying step, (i) n consecutive requests in the learning purpose data, which are consecutive requests to web pages in the learning purpose data, n being a first predetermined number (ii) a transition order of the web pages, and (iii) time intervals for the transitions between the web pages, as feature values of the learning purpose data, that performs learning by inputting the feature values of the learning purpose data to a machine learning algorithm;

creating a profile for each user based on the machine learning algorithm performing learning of feature values for each user;

a determination step of extracting, from the determination target data classified by the classifying, (i) n consecutive requests in the determination target data, which are consecutive requests to web pages in the determination target data, (ii) a transition order of the web pages, and (iii) time intervals for the transitions between the web pages, as feature values of the determination target data, the extracting including using each request in the determination target data classified by the classifying as a starting point, for each of w consecutive requests in the determination target data, the n consecutive requests as the feature values of the determination target data, where w is a second predetermined number greater than n; and determining as a determination result, based on the feature values of the determination target data and based on the profiles created by the creating, whether the determination target data is abnormal and outputting the determination result when the determination target data is determined to be abnormal, wherein the determining includes calculating scores for each of the w consecutive requests based on the feature values of the determination target data and based on the profiles created by the creating, determining whether the determination target data is abnormal based on an amount of change in the scores in a time series and a threshold, and further determining that a time point at which the score exceeds the threshold as a time point at which impersonation of a user has occurred.

6. A non-transitory computer-readable recording medium having stored an analysis program that causes a computer to execute a process comprising:

an inputting step of receiving an input of data, as learning purpose data and determination target data, in which requests made to a server by a user are represented in a time series;

a classifying step of classifying, for each user who made the requests, the data received at the inputting step;

a learning step of extracting, from the learning purpose data classified at the classifying step, (i) n consecutive requests in the learning purpose data, which are consecutive requests to web pages in the learning purpose data, n being a first predetermined number (ii) a transition order of the web pages, and (iii) time intervals for the transitions between the web pages, as feature values of the learning purpose data, that performs learning by inputting the feature values of the learning purpose data to a machine learning algorithm;

creating a profile for each user based on the machine learning algorithm performing learning of feature values for each user;

a determination step of extracting, from the determination target data classified by the classifying, (i) n consecutive requests in the determination target data, which are consecutive requests to web pages in the determination target data, (ii) a transition order of the web pages, and (iii) time intervals for the transitions between the web pages, as feature values of the determination target data the extracting including using each request in the determination target data classified by the classifying as a starting point, for each of w consecutive requests in the determination target data, the n consecutive requests as the feature values of the determination target data, where w is a second predetermined number greater than n; and determining as a determination result, based on the feature values of the determination target data and based on the profiles created by the creating, whether the determination target data is abnormal and outputting the determination result when the determination target data is determined to be abnormal, wherein the determining includes calculating scores for each of the w consecutive requests based on the feature values of the determination target data and based on the profiles created by the creating, determining whether the determination target data is abnormal based on an amount of change in the scores in a time series and a threshold, and further determining that a time point at which the score exceeds the threshold as a time point at which impersonation of a user has occurred.

7. The analysis device according to claim 1, wherein the feature values further include a number of types of pages appearing in the consecutive requests.

* * * * *